United States Patent [19]
Yi et al.

[11] Patent Number: 5,476,537
[45] Date of Patent: Dec. 19, 1995

[54] SEPARATION OF CHEMICAL SPECIES OF A MIXTURE USING VORTEX SEPARATION

[75] Inventors: Alex C. Yi, Cerritos; Joseph J. Gernand, Fountain Valley, both of Calif.

[73] Assignee: Rockwell International Corporation, Seal Beach, Calif.

[21] Appl. No.: 262,710

[22] Filed: Jun. 20, 1994

[51] Int. Cl.⁶ .................................................. B01D 45/12
[52] U.S. Cl. ................. 95/34; 55/277; 55/459.4
[58] Field of Search ............................ 95/31–35; 96/175; 55/277, 459.1, 459.4

[56] References Cited

U.S. PATENT DOCUMENTS

| | | | |
|---|---|---|---|
| 1,123,867 | 1/1915 | Gue | 494/900 X |
| 1,137,774 | 5/1915 | Mazza | 95/34 |
| 1,273,929 | 7/1918 | Morrison | 95/34 X |
| 1,339,211 | 5/1920 | McKerahan | |
| 1,508,405 | 9/1924 | Mazza | 95/35 |
| 2,394,357 | 8/1939 | Beese | 95/35 X |
| 2,444,222 | 8/1943 | Craig | 123/567 X |
| 2,741,899 | 4/1956 | Von Linde | 95/34 X |
| 3,129,075 | 4/1964 | Anliot | 95/34 |
| 3,251,542 | 5/1963 | Newgard et al. | 494/900 X |
| 3,296,807 | 1/1967 | Fekete | 95/34 |
| 3,861,142 | 1/1975 | Bose | 95/34 X |
| 3,877,450 | 4/1975 | Meeks | 123/567 |
| 3,961,609 | 6/1976 | Gerry | 123/567 |
| 3,977,850 | 8/1976 | Hill | 55/459.4 X |
| 4,067,814 | 1/1978 | Surakka et al. | 55/459.4 X |
| 4,078,535 | 3/1978 | Shafer | 123/198 |
| 4,092,130 | 5/1978 | Wikdahl | 95/34 |
| 4,093,427 | 6/1978 | Schlenker | 95/34 |
| 4,135,898 | 1/1979 | Rosengard | 95/34 X |
| 4,162,901 | 7/1979 | Enegess | 95/34 |
| 4,285,701 | 8/1981 | Schlenker | 95/34 |
| 4,292,051 | 9/1981 | Kime | 95/35 |
| 4,351,302 | 9/1982 | Brettler | 123/567 X |
| 4,681,071 | 7/1987 | Smith | 123/567 X |
| 4,867,766 | 9/1989 | Campbell et al. | 96/100 |
| 4,960,098 | 10/1990 | Akerib | 123/589 |

*Primary Examiner*—Robert Spitzer
*Attorney, Agent, or Firm*—Lawrence N. Ginsberg; Charles T. Silberberg

[57] ABSTRACT

An apparatus and method for separating chemical species of a mixture. A partially liquefied mixture having a mass fraction of less than 30% liquid is provided. This mixture is introduced in a tangential direction relative to and adjacent an inner surface of an elongated enclosure. The enclosure has a first end, an opposite second end, and a longitudinal axis. The inner surface has a substantially circular cross-section. The introduction of the mixture is at a sufficient velocity to form a vortex region in the enclosure. The vortex region contains at least two phases which interact. A first of the phases is a gas comprising a relative volatile chemical species, and the second of the phases is a relatively less volatile chemical species. The relatively volatile first gas phase exits from the first end of the enclosure and the relatively less volatile second phase exits from the second end of the enclosure. The present invention provides separation in an inexpensive, lightweight, low maintenance environment.

4 Claims, 3 Drawing Sheets

сь5,476,537

SEPARATION OF CHEMICAL SPECIES OF A MIXTURE USING VORTEX SEPARATION

BACKGROUND OF THE INVENTION

1. Field of the Invention

The present invention relates to the separation of chemical species and, more particularly, to utilizing vortex separation to provide separation of chemical species in a mixture.

2. Description of the Related Art

Separation processes are one of the most widely used industrial processes, especially in chemical and petrochemical industries. Such separation processes are also one of the most expensive industrial processes. They require costly capital investments such as distillation columns and high utility expenditures for both heating and cooling. Currently, the fractional distillation process is almost exclusively used for separation of species with high process rates. Other low flow rate processes, such as membrane, ion exchange, etc. are available with limited applications.

Separation of hot gases and cold gases by vortex separation methods is known. A single phase (gas) and single component (pure nitrogen, for example) vortex tube is known as the Ranqe-Hilsch tube illustrated in FIGS. 1a and 1b (Prior Art), designated generally as 1. In the tube, compressed gas is introduced through the nozzle 2 which is directed tangential to the tube. The gas generates a vortex as it travels into the center of the tube and propagates through the tube.

As the gas travels into the center of the vortex, the velocity of the gas increases due to the pressure gradient. The velocity is eventually reduced as the gas travels further into the tube center because the viscosity of the gas slows the fluid.

When the gas slows down in the center of the vortex, the gas has to surrender its kinetic energy. Kinetic energy in the vortex tube is released by transferring the energy from the inner to outer vortex. Thus, the energy separation occurs between the inner and outer vortex causing the temperature differential between the cold inner and hot outer vortex. The result of such an energy separation is that the hot gas 3 is directed in a first direction and cold gas 4 is directed in an opposite second direction.

Although the use of this Ranqe-Hilsch tube 1 is useful for refrigeration applications, it is not useful for providing separation of chemical species.

OBJECTS AND SUMMARY OF THE INVENTION

It is, therefore, a principal object of the present invention to provide a simple, reliable, and easy to maintain chemical separation process for high process rate applications.

This and other objects are achieved by the present invention which is an apparatus and method for separating chemical species of a mixture. A partially liquefied gaseous mixture having a mass fraction of less than 30% liquid is provided. This mixture is introduced in a tangential direction relative to and adjacent to an inner surface of an elongated enclosure. The enclosure has a first end, an opposite second end, and a longitudinal axis. The inner surface has a substantially circular cross-section. The introduction of the mixture is at a sufficient velocity to form a vortex region in the enclosure. The vortex region contains at least two phases which interact. A first of the phases is a gas comprising a relative volatile chemical species, and the second of the phases is a relatively less volatile chemical species. The relatively volatile first gas phase exits from the first end of the enclosure and the relatively less volatile second phase exits from the second end of the enclosure.

The present invention provides separation in an inexpensive, lightweight, low maintenance environment.

Other objects, advantages and novel features of the present invention will become apparent from the following detailed description of the invention when considered in conjunction with the accompanying drawings.

BRIEF DESCRIPTION OF THE DRAWINGS

The same elements or parts throughout the figures are designated by the same reference characters.

DETAILED DESCRIPTION OF THE PREFERRED EMBODIMENTS

Figure 1B:
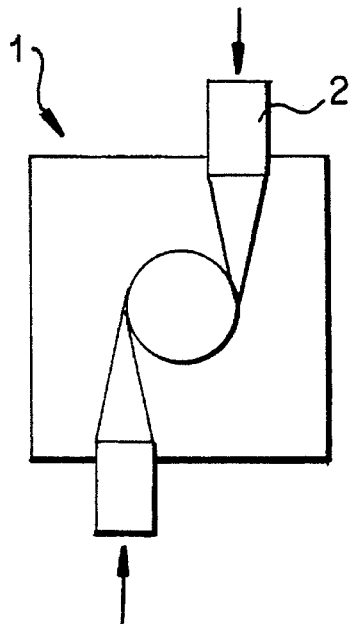
FIG. 1(b) (Prior Art) is an end view of the Ranqe-Hilsch vortex tube of FIG. 1(a).
Figure 1A:
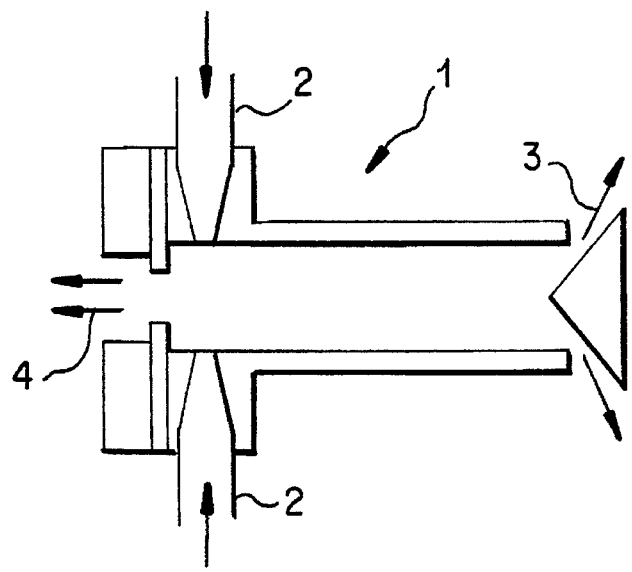
FIG. 1(a) (Prior Art) is a side elevation view in cross-section of a Ranqe-Hilsch vortex tube.
Figure 2:
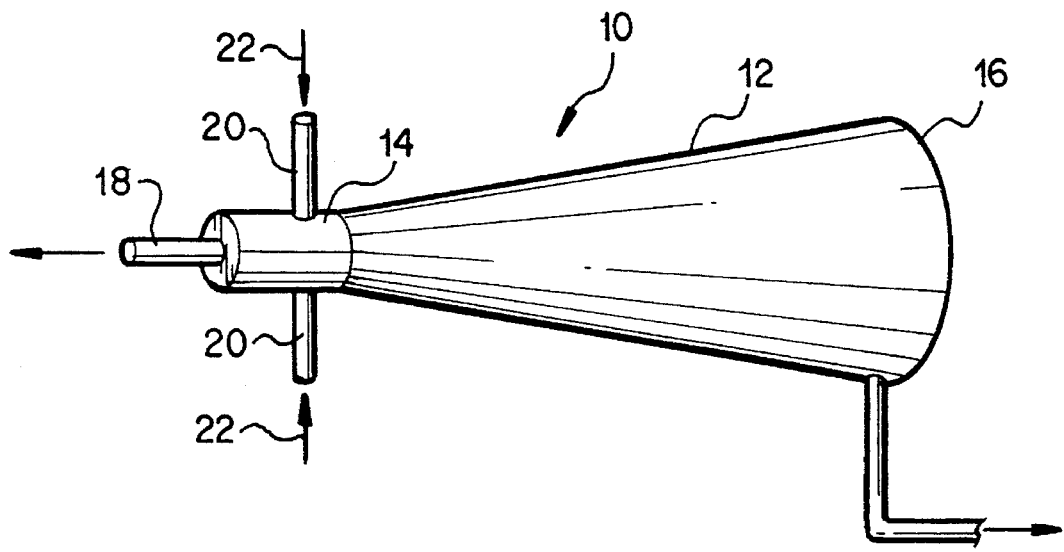
FIG. 2 is a perspective view of the two-phase flow vortex separator of the present invention.
Figure 3:
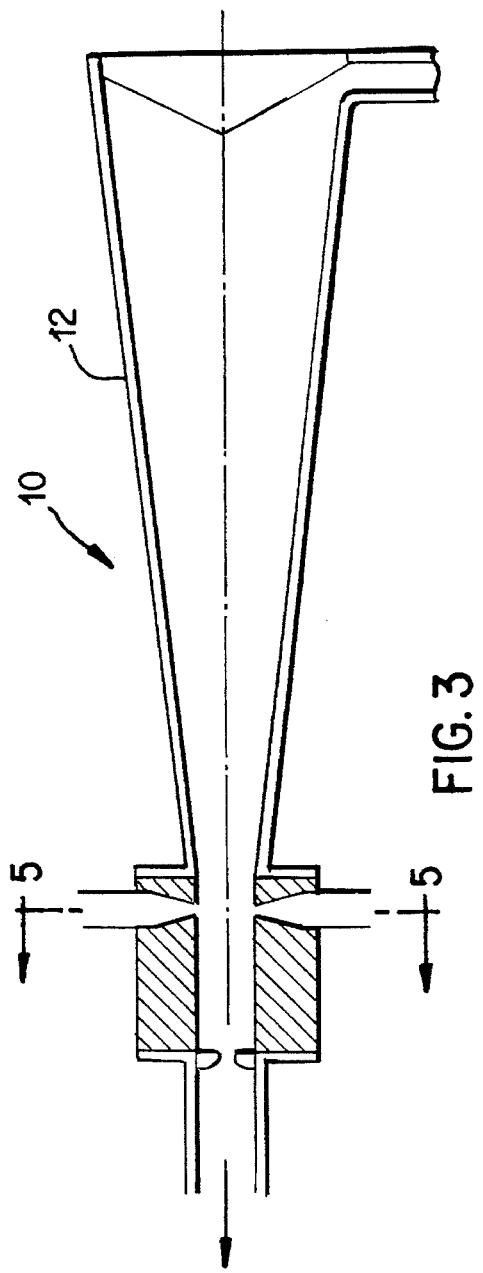
FIG. 3 is a cross-sectional view of the vortex separator of FIG. 2.

Referring again now to the drawings and the characters of reference marked thereon, FIGS. 2 and 3 show a perspective view of the apparatus of the present invention, designated generally as 10. Apparatus 10 comprises an elongated enclosure 12 having a first end 14 and an opposite second end 16. The inner surface of the elongated enclosure 12 is of a truncated conical shape (i.e. frustoconical). The apex portion is at the first end 14 and the base portion is at the second end 16. The inner surface of enclosure 12 is preferably smooth so as to minimize unwanted friction effects. The first end or apex portion 14 preferably has a restricted orifice 18. Inlets or means 20 for introducing a partially liquefied gaseous mixture is provided at the apex portion 14. Inlets 20 provide introduction of the gaseous mixture in a tangential direction relative to and adjacent to the inner surface of the enclosure 12.

Figure 4:
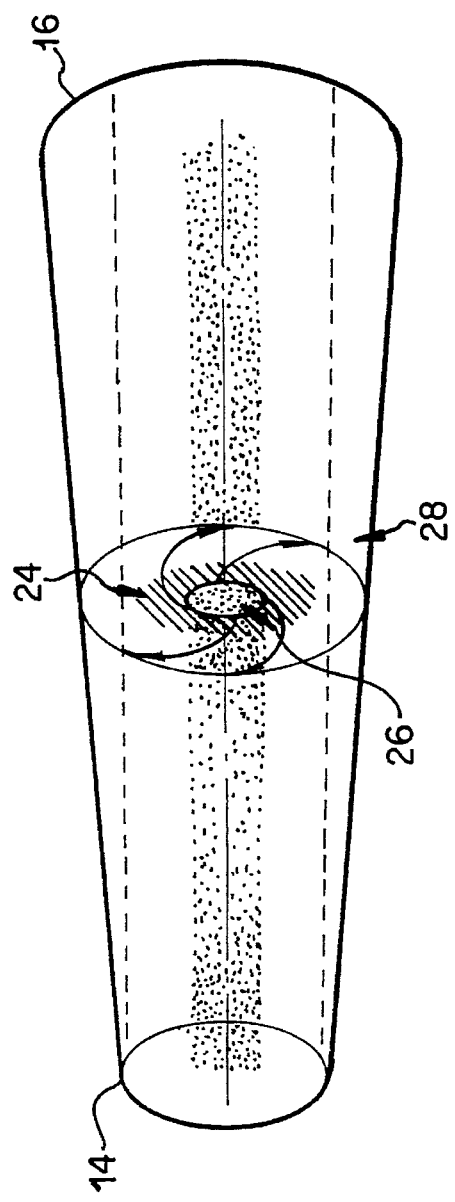
FIG. 4 is a perspective view of the vortex separator of the present invention showing flow interaction.

Referring now to FIG. 4, during operation of apparatus 10, a partially liquefied gaseous mixture having a mass fraction of less than 30% liquid, designated by arrows 22, is introduced. The introduction of mixture 22 is in a tangential direction relative to and adjacent to the inner surface. Such an introduction of gas must be at a sufficient velocity to form a vortex region in the enclosure 12. This velocity is generally at near sonic speeds (about 0.5 to 0.8 Mach number.

The vortex region 24 contains generally two phases which interact. A first phase 26 is a gas comprising a relatively volatile chemical species. A second phase 28 is a relatively less volatile chemical species. The relatively volatile first gas phase 26 exits the first end 14 of the enclosure 12. The relatively less volatile second phase 28 exits the second end 16 of the enclosure 12.

It is believed that the separation of the volatile and less volatile species operates in a manner similar to fractional distillation. The vapor mixture condenses in small droplets at the cold inner core and is enriched with less volatile species.

The principle of operation, as it relates to air, will now be described. The partially liquefied gaseous mixture, i.e. air, enters the inlet 20 where the air stream generates a high speed vortex. The vortex propagates down to the enclosure 12, where the oxygen, the less volatile species in the air, liquefies at the center axis. As the liquid droplets form at the inner vortex core, the centrifugal force of the rotating inner core throws them outward. Since the temperature of the outer core is higher than the inner core, the more volatile component (nitrogen) in the liquid droplets evaporate and moves toward the inner core. Thus, when the condensate reaches the wall of the vortex separator or closure 12, it is further enriched with oxygen.

The liquid droplets moving toward the outer core, and the vapor moving into the inner core are vigorously mixed by the turbulent vortex flow transferring mass and heat very efficiently. Similar mass and heat transfer occurs in the axial direction when the inner and outer vortex cores move in opposite directions as the outer vortex travels in the direction of end 16 in the axial direction.

In analogy to the process of fractional distillation, the cold inner core in the vortex closure 12 acts as a condenser/reflex, the hot outer core as a re-boiler and the turbulent mixing region as trays in the distillation column.

Eventually, the liquid condensate accumulates at the vortex enclosure inner wall enriched with oxygen. The liquid travels toward end 16 of the vortex enclosure due to pressure and gravity forces and is collected. Vapor with concentrated nitrogen leaves from the end 14 of the vortex enclosure 12.

Figure 5:
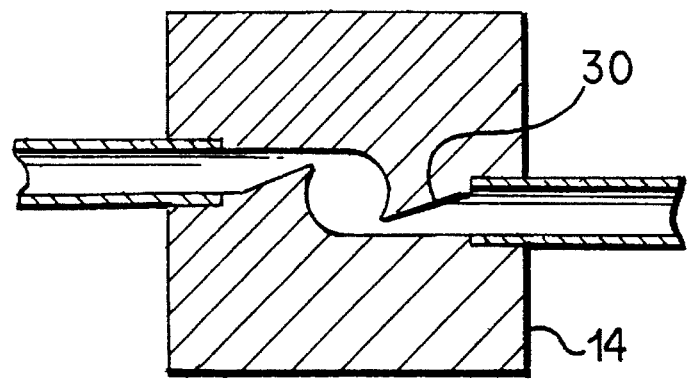
FIG. 5 is a cutaway end view of contracting conical inlets of the vortex separator of the present invention.

Referring now to FIG. 5, a cutaway end view of a first type of a gas mixture inlet comprising contracting conical inlets, designated generally as 30, is illustrated. Such contracting conical inlets 30 provide introduction of the gaseous mixture in the required tangential direction. Although the FIG. 5 shows only two conical inlets 30, it is preferable to have more inlets, perhaps up to around eight inlets 30.

Figure 6:
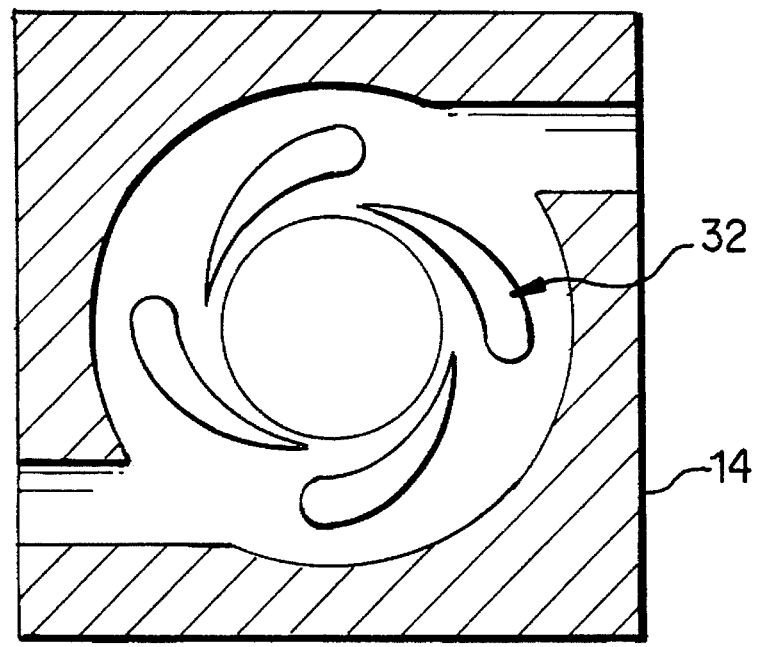
FIG. 6 is a cross-sectional view of alternate wing-type inlet vanes.

Referring now to FIG. 6, an alternate inlet configuration is illustrated comprising a plurality of vanes 32, each vane 32 having a wing-type cross-section. Use of vanes 32 minimize the abrupt expansion of gaseous flow.

Although the present invention has been described in the above particular application with air, it is useful for a variety of chemical separation applications. For example, in petroleum refinery applications it may be used to separate methane, or propane from crude oil. It has applications in the separation of chemicals and chemical industries such as the separation or purification of benzene from a mixture. It may also have applications in the purification of drugs in the pharmaceutical industry.

Although the present invention may typically utilize a gas phase and a liquid phase, it is possible that solid and gas phases may be separated by application of the principles of this invention. For example, solid carbon dioxide may be separated from air.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A method for separating chemical species of a mixture, comprising the step of:

providing a partially liquefied gaseous mixture having a mass fraction of less than 30% liquid;

introducing said partially liquefied gaseous mixture in a tangential direction relative to and adjacent an inner surface of an elongated enclosure, said enclosure having a first end, an opposite second end, and a longitudinal axis, said inner surface having a substantially circular cross-section, the introduction of said partially liquefied gaseous mixture being of sufficient velocity to form a vortex region in said enclosure, said vortex region containing at least two phases which interact, a first of said phases being a gas comprising a relatively volatile chemical species and a second of said phases being a relatively less volatile chemical species, said relatively volatile first gas phase exiting said first end of said enclosure, and said relatively less volatile second phase existing said second end of said enclosure.

2. The method of claim 1 wherein the second phase being a liquid.

3. The method of claim 1, wherein said step of introducing said mixture comprises injection at near sonic speeds.

4. The method of claim 1, wherein said step of introducing said mixture comprises injection of air.

\* \* \* \* \*